US005809134A

United States Patent [19]
Consiglio et al.

[11] Patent Number: 5,809,134
[45] Date of Patent: Sep. 15, 1998

[54] TELEPHONE INTERFACE CIRCUIT WITH IMPEDANCE TERMINATION DURING CALL PAUSES

[75] Inventors: Pietro Consiglio, Milan; Carlo Antonini, Venegono Inferiore, both of Italy

[73] Assignee: STMicroelectronics S.r.l., Agrate Brianza, Italy

[21] Appl. No.: 654,625

[22] Filed: May 29, 1996

[30] Foreign Application Priority Data

May 30, 1995 [EP] European Pat. Off. .............. 95830244

[51] Int. Cl.$^6$ ..................................... H04M 1/00
[52] U.S. Cl. ........................ 379/394; 379/377; 379/387; 379/398; 379/418
[58] Field of Search ..................... 379/394, 387, 379/398, 418, 383, 162, 93.05, 100.15, 399, 377

[56] References Cited

U.S. PATENT DOCUMENTS

| 3,935,393 | 1/1976 | Vancoillie | 379/383 |
|---|---|---|---|
| 4,025,729 | 5/1977 | Stone | 379/418 |
| 4,099,031 | 7/1978 | Proctor et al. | 379/183 |
| 4,323,734 | 4/1982 | Kimzey | 379/162 |
| 4,431,871 | 2/1984 | Gupta | 179/84 |
| 4,465,903 | 8/1984 | Barber | 179/86 |
| 4,991,200 | 2/1991 | Lin | 379/100.15 |
| 5,117,452 | 5/1992 | Callele et al. | 379/442 |
| 5,329,190 | 7/1994 | Igarashi et al. | 379/398 |
| 5,436,968 | 7/1995 | Parker, Jr. et al. | 379/394 |
| 5,461,670 | 10/1995 | Consiglio et al. | 379/418 |
| 5,502,760 | 3/1996 | Gilbert et al. | 379/93.05 |

FOREIGN PATENT DOCUMENTS

| WO-A-85 00488 | 1/1985 | WIPO | H04M 3/42 |
|---|---|---|---|
| WO-A-94 03990 | 2/1994 | WIPO | H04M 1/58 |

OTHER PUBLICATIONS

European Search Report from European Patent Application 95830224.2, filed May 30, 1995.

*Primary Examiner*—Krista Zele
*Assistant Examiner*—Jacques M. Sanit-Surin
*Attorney, Agent, or Firm*—Wolf, Greenfield & Sacks, P.C.

[57] ABSTRACT

A telephone interface circuit with impedance termination during call pauses, comprising first and second terminals to connect to a telephone line and a line termination branch connected to the first terminal across a decoupling capacitor, and to the second terminal. The line termination branch includes an intersection node, a first switch and a first impedance resistor between the first terminal and the intersection node, and a second switch and a second impedance resistor between the second terminal and the intersection node. The intersection node is connected to ground across a third switch. The first switch, the second switch, and the third switch are controlled by a control unit by first, second and third control lines, respectively. The telephone interface circuit further comprises a ring signal detector that is connected to a microprocessor unit capable of activating the control unit in an interval in which the circuit must be terminated for CLID (Calling Line IDentification) transmission.

20 Claims, 5 Drawing Sheets

TELEPHONE INTERFACE CIRCUIT WITH IMPEDANCE TERMINATION DURING CALL PAUSES

BACKGROUND OF THE INVENTION

1. Field of the Invention

The present invention relates to a telephone interface circuit with impedance termination during call pauses.

2. Discussion of the Related Art

New additional functions are required as the performance required of telephone terminals evolves. An aspect of this performance is the requirement to identify the user who is calling and to optionally show this identification on a display on the set of the called party. This function is known as CID (Call IDentification) or as CLID (Calling Line IDentification) and occurs, for example by transmitting, over the telephone line, information Tx at a low amplitude level and at a low bit rate (V23/1200 baud) in the interval A between the two ring signals RING1 and RING2, as illustrated in FIG. 1.

During the interval A, it is necessary to terminate the telephone line at a very specific impedance (typically 1200 ohm). This impedance termination during the call interval should be performed by using either the power supply taken from the telephone line itself or by means of external power supply. It should be remembered that no DC current should be absorbed from the telephone line during ringing. Furthermore, line termination during the call interval requires the insertion of new circuits that should not alter the current performance of the telephone set. The line termination circuit should be capable of withstanding the high voltages that can be present in the various operating configurations. Furthermore, it should be independent of the polarity of the line. Moreover, during the conversation and calling periods the circuit should be completely open (OFF) and should have low power consumption.

SUMMARY OF THE INVENTION

It is an aim of the present invention to provide a telephone interface circuit with impedance termination during call pauses that is capable of terminating the telephone line at a preset impedance value during the interval between two ring signals. Within the scope of this aim, an object of the present invention is to provide a telephone interface circuit with impedance termination during call pauses that does not alter the current performance of the telephone set.

Another object of the present invention is to provide a telephone interface circuit with impedance termination during call pauses that is capable of withstanding the high voltages that may be present in the various operating configurations.

Another object of the present invention is to provide a telephone interface circuit with impedance termination during call pauses that is independent of the polarity of the line.

Another object of the present invention is to provide a telephone interface circuit with impedance termination during call pauses that is a fully open circuit during conversation and calling periods and has low power consumption.

Another object of the present invention is to provide a telephone interface circuit with impedance termination during call pauses that is DC-decoupled from the telephone line.

Another object of the present invention is to provide a telephone interface circuit with impedance termination during call pauses that is highly reliable and is relatively easy to manufacture at a competitive cost.

This aim, these objects, and others which will become apparent hereinafter are achieved by a telephone interface circuit with impedance termination during call pauses comprising: first and second terminals to connect to a telephone line and a line termination branch connected to the first terminal across a decoupling capacitor, and to the second terminal. The line termination branch further includes an intersection node, a first switch and a first impedance resistor between the first terminal and the intersection node, and a second switch and a second impedance resistor between the second terminal and the intersection node. The intersection node is connected to ground across a third switch, and the first switch, the second switch, and the third switch are controlled by a control unit by a first, a second, and a third control line, respectively.

The characteristics and advantages of the invention will become apparent from the description of a preferred but not exclusive embodiment thereof, illustrated by way of non-limitive example in the accompanying drawings, in which.

DETAILED DESCRIPTION

Figure 2A:
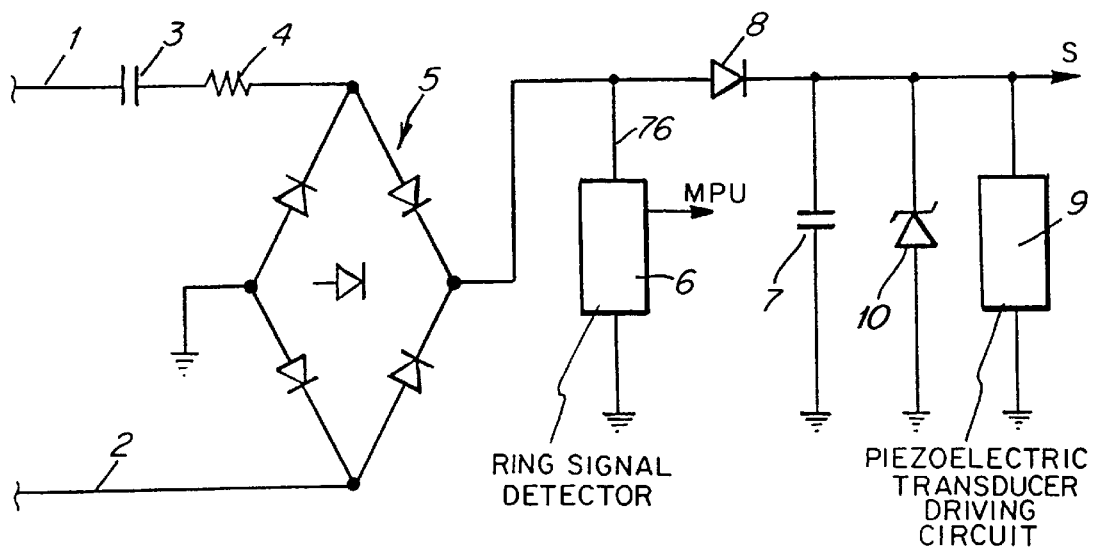
FIG. 2A is a block diagram of a ring signal power supply and detection circuit when a piezoelectric transducer is used.

With reference to FIG. 2A, the first and the second terminals of the telephone line are respectively designated by the reference numerals 1 and 2. A decoupling capacitor 3, adapted to decouple the telephone line from the DC component, is arranged on the first terminal 1 of the telephone line. A resistor 4 is furthermore connected to the capacitor 3 and helps to determine the impedance of the telephone line during ringing. The two telephone line terminals 1 and 2 are connected to terminals of a classic-bridge rectifier 5. The input 76 of a ring signal detector 6 is connected to the output of the rectifier 5. The detector 6 is adapted to detect the presence of a ring signal RING1 or RING2 on the telephone line. According to the result of the detection, said detector sends a signal MPU to a microprocessor unit (not shown) that controls the impedance of the entire circuit.

A filtering capacitor 7 is furthermore parallel-connected to the rectifier 5 and is adapted to filter the signal rectified by the rectifier 5. Furthermore, a diode 8 is series-connected to the rectifier 5 and allows the block 6 to detect the frequency of the ring signal.

A driving circuit for a piezoelectric transducer 9 of the high-voltage type (approximately 30 volts) is arranged in parallel with the filtering capacitor 7 and is protected by a Zener diode 10 that is parallel-connected thereto. The output of the circuit of FIG. 2A is designated by the letter S and is sent to the remaining part of the system for power supply.

Figure 2B:
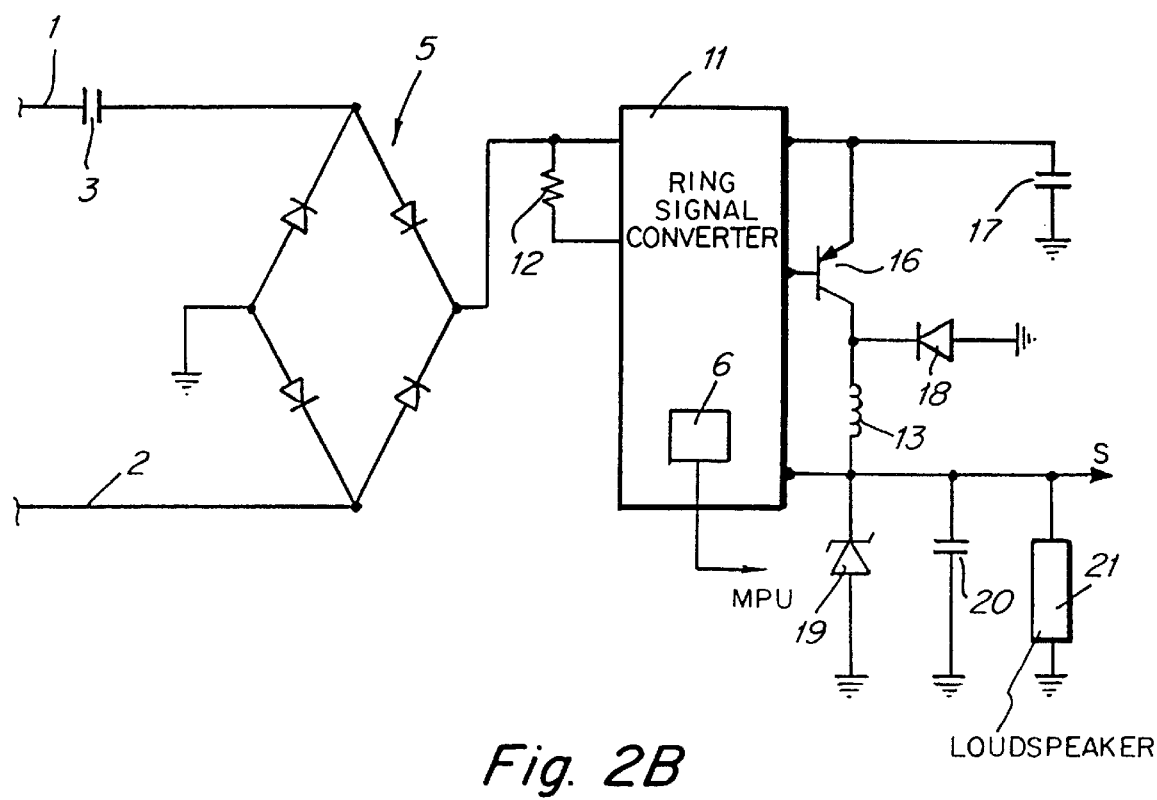
FIG. 2B is a block diagram of a ring signal power supply and detection circuit when a loudspeaker is used.

FIG. 2B illustrates a power supply extraction circuit for a driving circuit for an acoustic transducer, that is to say, a loudspeaker. This circuit, like the previous circuit, comprises a decoupling capacitor 3 that is serially connected to the first terminal. Terminals 1 and 2 of the telephone line are, as in the previous case, connected to the rectifier 5, whose output is connected to a telephone ring signal converter 11. A control resistor 12 is furthermore associated with the input of the converter 11 and adjusts its impedance. The converter 11 furthermore comprises the ring signal detector 6, which sends the signal MPU to the microprocessor unit.

The converter 11 comprises a transistor 16, a capacitor 17, an inductor 13, and a diode 18, which allow a switched mode power supply. A protection Zener diode 19, a filtering capacitor 20, and a loudspeaker 21 are parallel-connected on the same branch. As in the previous case, the output of the circuit of FIG. 2B is designated by the letter S and is sent to the remaining part of the system for power supply.

In the circuit of FIG. 2A, the impedance is determined by the values of the capacitor 3 and of the resistor 4, whereas in the case of the circuit of FIG. 2B the impedance is determined by the value of the resistor 12 divided by an internal current mirroring factor K of the converter 11.

Figure 3:
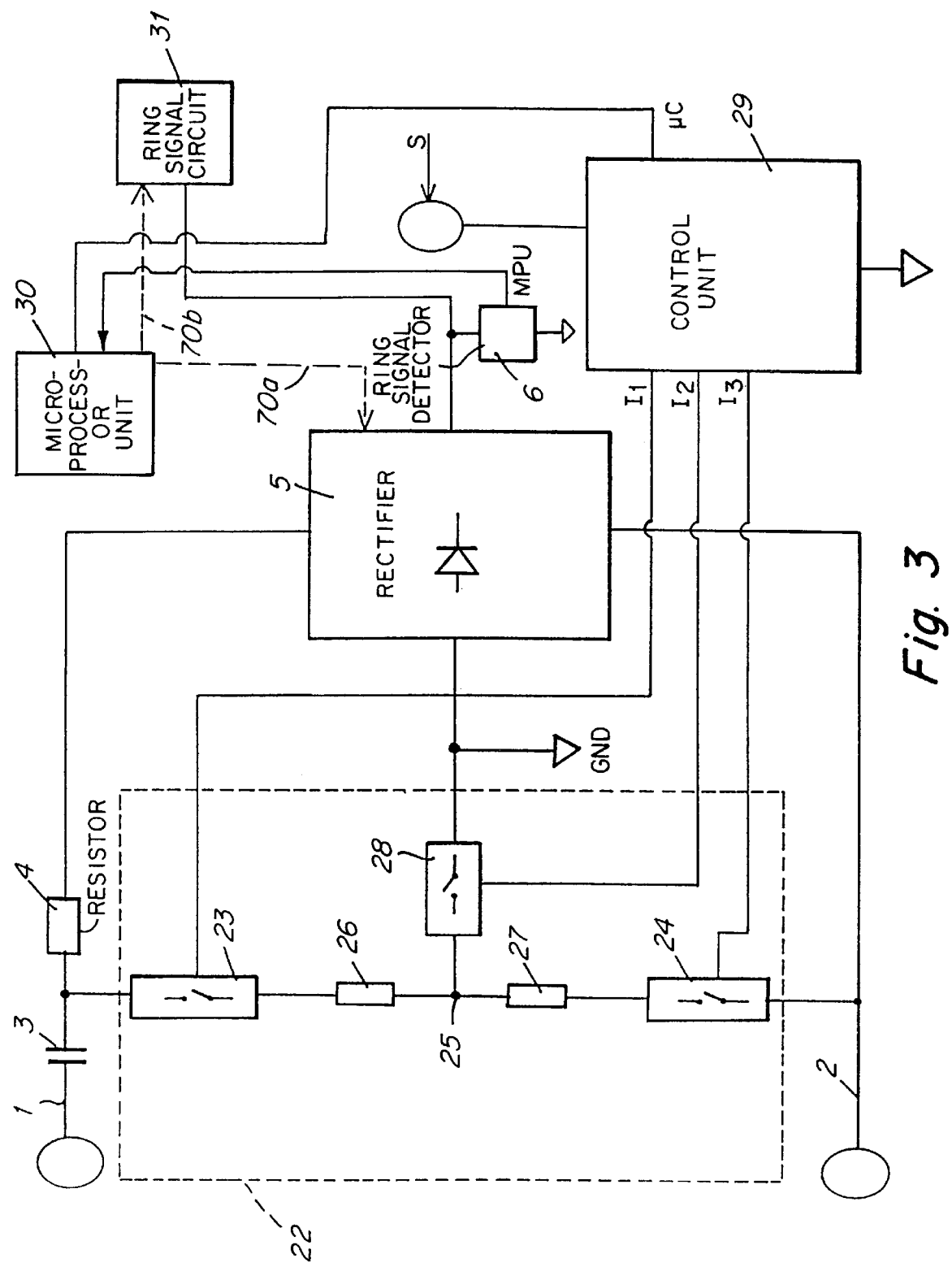
FIG. 3 is a block diagram of the line termination circuit according to an embodiment of the present invention.

FIG. 3 illustrates the telephone line termination circuit according to an embodiment of the present invention. The terminals of the telephone line, as before, are designated by the reference numerals 1 and 2. The termination circuit can use the same decoupling capacitor 3 and the same impedance resistor 4 as the power supply circuit of FIGS. 2a and 2b.

The first terminal 1 is connected, downstream of the capacitor 3, to the second terminal by means of a line termination branch 22. Said branch comprises a first switch 23 and a second switch 24 connected in series. An interposition node 25 is provided between the first switch 23 and the second switch 24, so that the branch 22 is divided into two half-branches. A resistor is arranged in each of the half-branches and is connected in series to each one of the respective switches 23 and 24. In this manner, a first impedance resistor 26 is series-connected to the first switch 23 and a second impedance resistor 27 is series-connected to the second switch. The corresponding resistor can be located on either side of the switch 23 or 24. The interposition node 25 is connected to the ground GND by means of a third switch 28.

Figure 1:
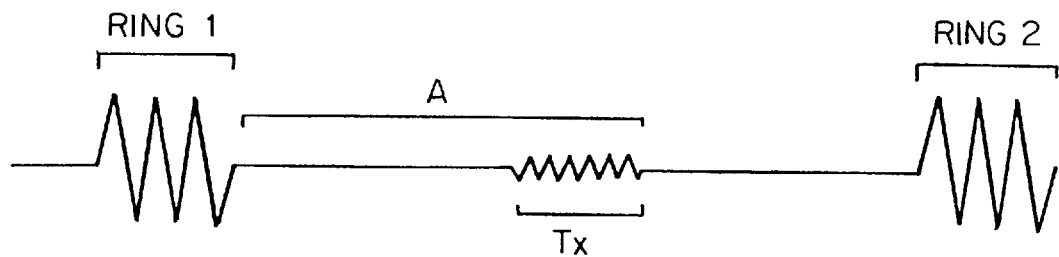
FIG. 1 is an example of CLID transmission in the interval between two ring signals.

All three switches 23, 24, and 28 are controlled by a control unit 29 by means of the respective control lines I1, I2, and I3. The control unit 29 is powered by the power supply S and receives a control signal $\mu C$ from the microprocessor unit 30. The control signal $\mu C$ is sent to the control unit 29 during the interval A of FIG. 1, that is to say, when the circuit must be terminated for CLID transmission.

The circuit furthermore comprises the rectifier 5, which is connected to the terminals 1 and 2 and supplies the ring signal circuit, generally designated by the reference numeral 31 herein. The microprocessor furthermore has inhibition lines 70a and 70b that deactivate the rectifier 5, if it is provided in the active mode, or deactivate the circuit located downstream of the ring signal circuit 31 in order to eliminate any distortions of the signal in the presence of high levels.

Figure 4:
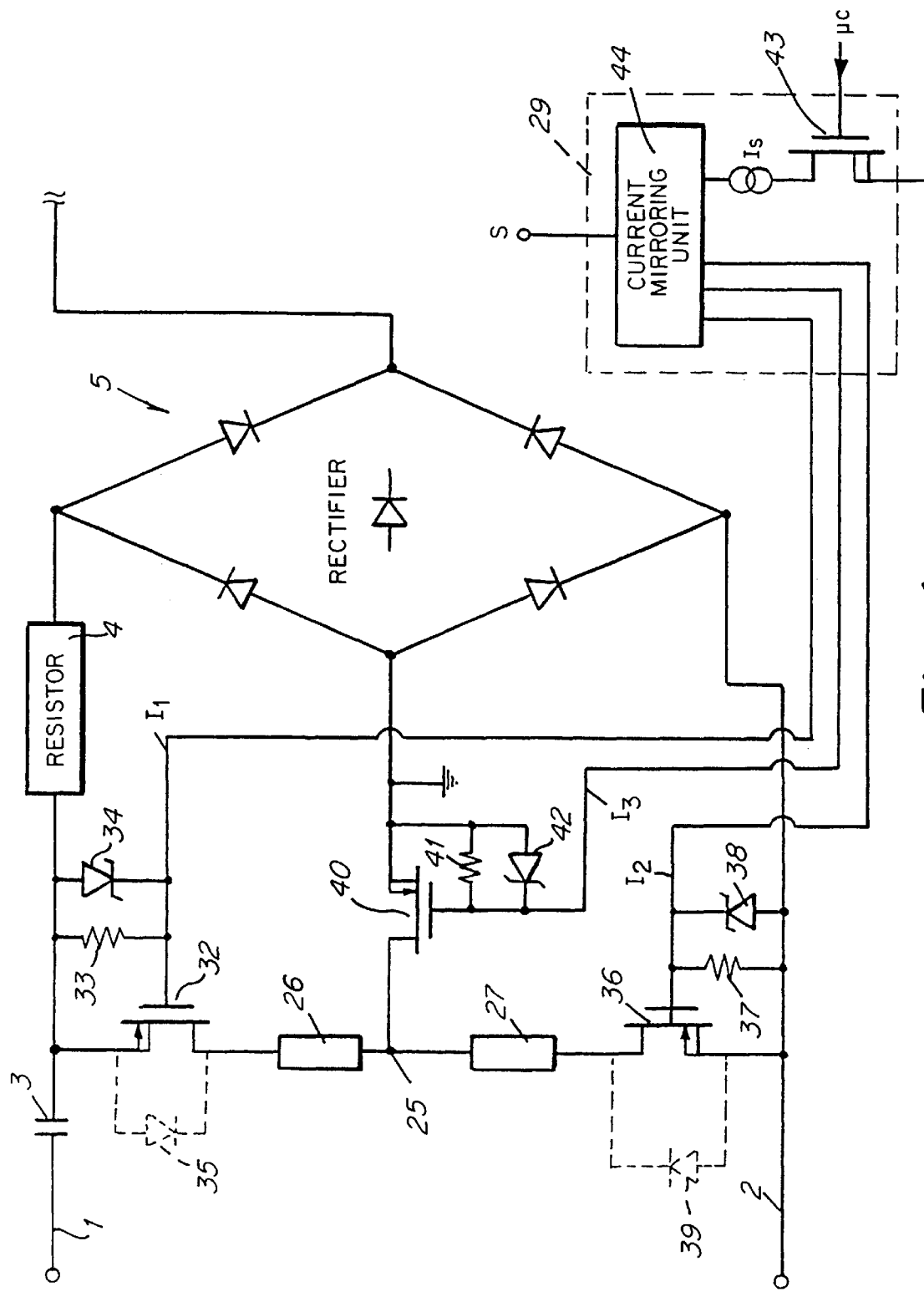
FIG. 4 is an electrical diagram of a line termination circuit according to an embodiment of the present invention.

The hardware embodiment of the circuit of FIG. 3 is shown in FIG. 4. Each one of the switches 23, 24, and 28 is composed of an N-channel MOSFET transistor, a Zener diode, and a resistor.

More specifically, the first switch 23 comprises a first N-channel transistor 32 in which the source and the body are connected downstream of the first terminal 1 and the drain is connected to the node 25 (across the resistor 26). The gate of the transistor 32 is connected to the first control line I1. A first resistor 33 connects the first terminal 1 to the control line I1, and a Zener diode 34 is parallel-connected to said first resistor (the cathode is connected to the control line I1). The transistor 32 furthermore comprises an intrinsic diode 35, illustrated herein for the sake of practicality, which is formed by the semiconductor structure of the transistor itself. The anode of the diode 35 is connected to the source of the transistor 32 and the cathode is connected to the drain of the transistor 32.

The second switch 24 comprises a second N-channel transistor 36 in which the source and body terminals are connected to the second terminal 2 and the drain terminal is connected to the interposition node 25 (across the resistor 27). The gate of the transistor 36 is connected to the second control line I2. A second resistor 37 connects the control line I2 to the second terminal 2. The cathode of a second Zener diode 38 is connected to the second control line I2, whereas the anode is connected to the second terminal 2. Like the first transistor 32, the second transistor 36 also comprises an intrinsic diode 39.

The third switch 28 comprises a third N-channel transistor 40 in which the source and the body are connected to the ground and the drain is connected to the interposition node 25. The gate of the transistor 40 is connected to the third control line I3. A third resistor 41 connects the third control line I3 to the ground, and a third Zener diode 42 is parallel-connected to said resistor, its cathode being connected to the third control line I3 and its anode being connected to the ground GND.

Finally, the control unit 29 comprises an activation transistor 43 driven by the microprocessor unit 30. Said transistor 43 is series-connected to a current source Is that is connected to a current mirroring unit 44, which generates the currents that are sent over the control lines I1, I2, and I3.

The operation of the circuit according to the present invention is as follows. Initially, the ring signal detector 6 detects the presence of ring signals and notifies the microprocessor unit 30 of the presence of said signals. The microprocessor unit 30 activates, at the appropriate time, the activation transistor 43, which in turn activates the current source Is. The current source Is induces a current value in the current mirroring unit 44, so that the control lines I1–3 conduct a current that is set by the current source Is.

When the currents are activated in the control lines, the current in the control line I3 induces a voltage across the third resistor 41 and causes a voltage drop across the gate and the source of the third transistor 40. In this manner, the transistor 40 is switched on and the intersection point 25 is set to the ground voltage.

Then the control line I1 induces a current across the first resistor 33, the intrinsic diode 35, and the resistor 26 towards the intersection point 25, which is at the ground value. In this manner, a voltage drop is produced across the resistor 33, causing the first transistor 32 (which has a low internal resistance ($R_{on}$) to switch on.

Likewise, the second control line I2 induces a current across the resistor 37, the intrinsic diode 39, and the resistor 27 towards the intersection point 25, which is at ground voltage. In this manner, a voltage drop is produced across the second resistor 37, switching on the second transistor 36 (which has a low resistance $R_{on}$). Since both the first transistor 32 and the second transistor 36 are switched on, the telephone line formed by the terminals 1 and 2 is terminated with the impedance resistors 26 and 27 and by the internal resistance $R_{on}$ of the transistors 32 and 36.

The CLID signal is an AC signal (see FIG. 1) having a modest amplitude. The values of the impedance resistors 26 and 27 need to be correlated to the internal resistance value $R_{on}$ of the transistors 32 and 36, so that the CLID current does not switch on the intrinsic diodes 35 and 39. In practice, the impedance resistors must be much higher in value than the internal resistances $R_{on}$ of the transistors 32 and 36.

Figure 5A:
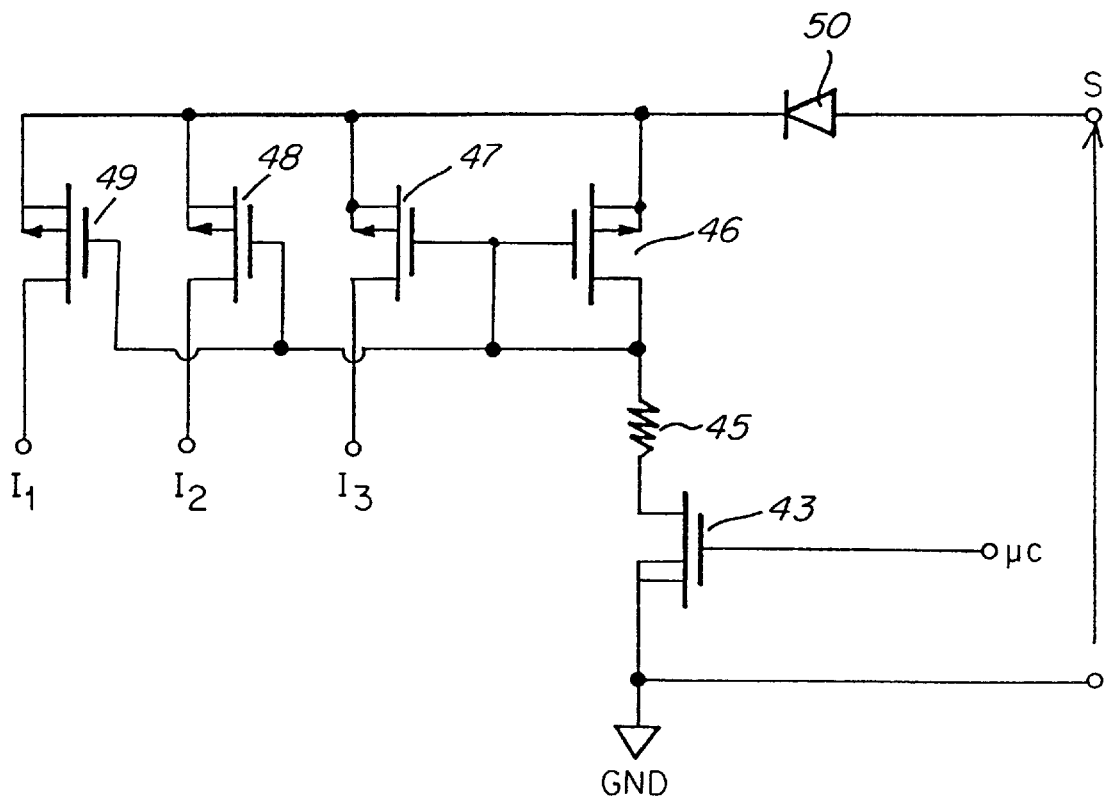
FIG. 5A is an electrical diagram of a first embodiment of a control unit according to the present invention.
Figure 5B:
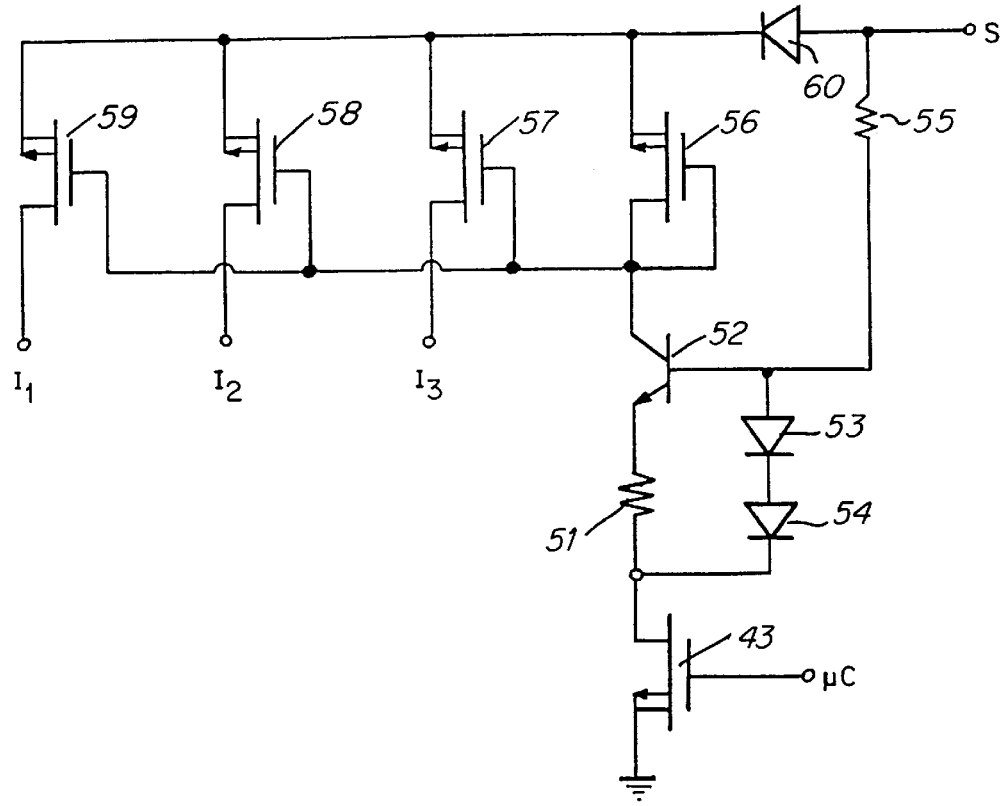
FIG. 5B is an electrical diagram of a second embodiment of a control unit according to the present invention.
Figure 5C:
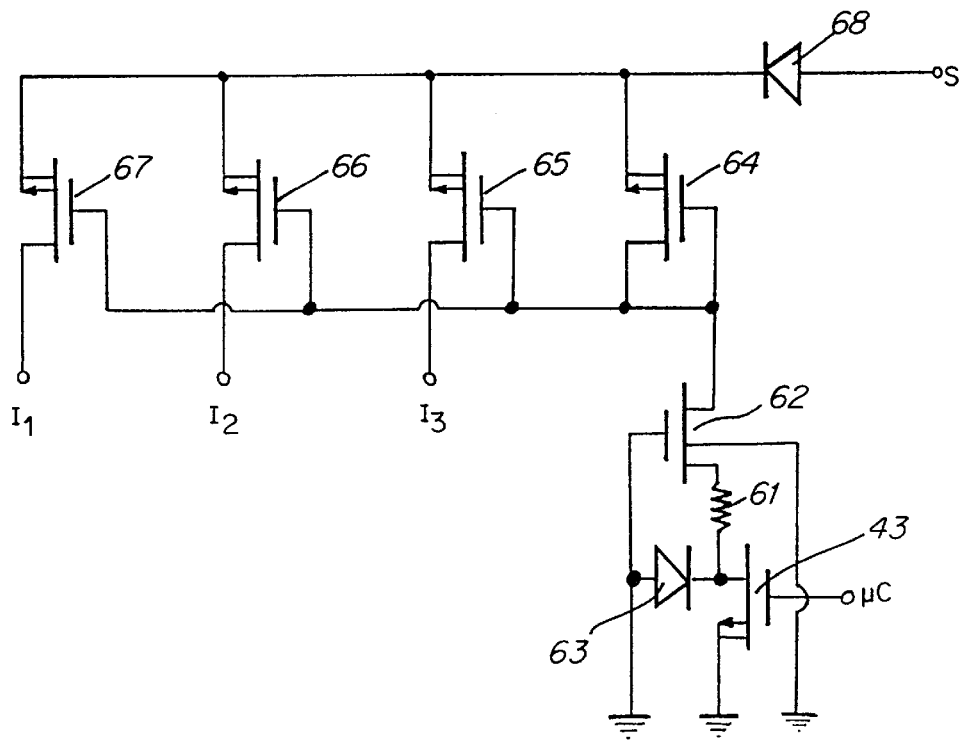
FIG. 5C is an electrical diagram of a third embodiment of a control unit according to the present invention.

The control unit 29 can be provided in various manners. FIGS. 5A–C illustrate three possible embodiments of the control unit 29. With reference to FIG. 5A, the activation transistor 43 of the N-channel type, activated by the microprocessor unit 30, is series-connected to an adjustment resistor 45, which in turn is connected to the drain/gate of an adjustment transistor 46 of the P-channel type. The gate of the transistor 46 is connected to the gates of a first current source transistor 47, of a second current source transistor 48, and of a third current source transistor 49, all of which are of the P-channel type. The source of the adjustment transistor 46 is also connected to the sources of the transistors 47–49, and said source terminals are connected, across a diode 50, to the supply voltage S. The drains of the transistors 47–49 constitute the respective outputs for the control lines I1, I2, and I3.

This current source is useful when the supply voltage S is defined as external and therefore the value of the adjustment resistor 45 sets the value of the absorbed current.

With reference to FIG. 5B, the activation transistor 43 is again provided and is connected to the ground GND. Said transistor 43 is series-connected to an adjustment resistor 51, which is connected to the emitter of an NPN transistor 52. The base of the transistor 52 is connected to the drain of the activation transistor 43 across two diodes 53 and 54. The base is furthermore connected to the supply voltage S across a resistor 55. The collector of the NPN transistor 52 is connected to the gate and to the drain of a P-channel transistor 56. The gate of the transistor 56 is connected to the gates of three current source transistors 57, 58, and 59, all of which are of the P-channel type. The sources of the transistors 57–59 are also connected to the source of the transistor 56 and to the supply voltage S across a diode 60. The drains of the transistors 57–59 constitute the respective outputs for the control lines I1, I2, and I3.

The current delivered in this embodiment depends on the voltage $V_{be}$ divided by the value of the resistor 51 and is therefore temperature-dependent, but offers the advantage that it is independent of the supply voltage S. The absorbed current is substantially constant, since the value of the resistor 55 is sufficiently high.

With reference to FIG. 5C, the reference numeral 43 designates the activation transistor, which is driven by the microprocessor unit 30. Said transistor is series-connected to an adjustment resistor 61 and to the source of a MOSFET transistor 62 of the depletion type. The gate and the body terminal of the transistor 62 are connected to the ground. Furthermore, the anode of the Zener diode 63 is connected to the gate of the transistor 62 and its cathode is connected to the drain of the transistor 43. The drain terminal of the depletion transistor 62 is connected to the gate and to the drain of a P-channel transistor 64. The gate of the transistor 64 is furthermore connected to the gates of three transistors of the P-channel type 65, 66, and 67. The source of the transistor 64 is also common-connected to the sources of the transistors 65–67, which are connected to the supply voltage S across a diode 68.

The drains of the transistors 65–67 respectively constitute the outputs for the control lines I1, I2, and I3.

The transistors 46–49 of FIG. 5A may be replaced with PNP transistors. The transistors 56–59 of FIG. 5B may be replaced with PNP transistors. The transistors 64–67 of FIG. 5C may be replaced with PNP transistors.

It is important to stress that the control lines I1, I2, and I3 need to be connected to a junction P at the current mirroring unit 44 if there is a negative voltage across the terminals 1 and 2 of the telephone line in the OFF state of the termination circuit.

From the above description it is evident that the present invention fully achieves the intended aim and objects.

The invention thus conceived is susceptible of numerous modifications and variations, all of which are within the scope of the inventive concept.

Finally, all the details may be replaced with other technically equivalent ones. In practice, the materials employed, as well as the shapes and dimensions, may be any according to the requirements, without thereby abandoning the scope of the protection of the appended claims.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A telephone interface circuit with impedance termination during call pauses, comprising:
    first and second terminals to connect to a telephone line;
    a decoupling capacitor connected to the first terminal;
    a circuit branch having a first end that is connected across the decoupling capacitor to the first terminal, and having a second end that is connected to the second terminal, the circuit branch having an intersection node, first and second switches, and first and second impedance resistors, the first switch and the first impedance resistor being serially coupled between the first end and the intersection node, and the second switch and the second impedance resistor being serially coupled between the second end and the intersection node;
    a third switch connected between ground and the intersection node; and
    a control unit to control the first, second, and third switches, the control unit coupled to the first switch by a first control line, coupled to the second switch by a second control line, and coupled to the third switch by a third control line.

2. The telephone interface circuit of claim 1, wherein the first switch includes:
    a transistor having a gate, a source, and a drain, the gate being connected to the first control line, the source being coupled to the first end of the circuit branch, and the drain being coupled to the intersection node;
    a resistor being connected between the first end of the circuit branch and the first control line; and
    a zener diode having an anode and a cathode, the anode being connected to the first end of the circuit branch, and the cathode being connected to the first control line.

3. The telephone interface circuit of claim 2, wherein the transistor includes an intrinsic diode having an anode and a cathode, the anode of the diode being formed by the source of the first transistor, and the cathode being formed by the drain of the first transistor.

4. The telephone interface circuit of claim 2, wherein the second switch includes:
a second transistor having a gate, a source, and a drain, the gate of the second transistor being connected to the second control line, the source of the second transistor being coupled to the second end of the circuit branch, and the drain of the second transistor being coupled to the intersection node;
a second resistor being connected between the second end of the circuit branch and the second control; and
a second zener diode having an anode and a cathode, the anode of the second zener diode being connected to the second end of the circuit branch, and the cathode of the second zener diode being connected to the second control line.

5. The telephone interface circuit of claim 1, wherein the second switch includes:
a transistor having a gate, a source, and a drain, the gate being connected to the second control line, the source being coupled to the second end of the circuit branch, and the drain being coupled to the intersection node;
a resistor being connected between the second end of the circuit branch and the second control line; and
a zener diode having an anode and a cathode, the anode being connected to the second end of the circuit branch, and the cathode being connected to the second control line.

6. The telephone interface circuit of claim 5, wherein the transistor includes an intrinsic diode having an anode and a cathode, the anode of the diode being formed by the source of the first transistor and the cathode being formed by the drain of the first transistor.

7. The telephone interface circuit of claim 1, wherein the third switch includes:
a transistor having a gate, a source, and a drain, the gate being connected to the third control line, the source being connected to ground, and the drain being connected to the intersection node;
a resistor being connected between ground and the third control line; and
a zener diode having an anode and a cathode, the anode being connected to ground, and the cathode being connected to the third control line.

8. The telephone interface circuit of claim 1, further comprising:
a ring signal detector coupled to the first and second terminals, the ring signal detector detecting a presence of ring signals on the telephone line; and
a microprocessor unit coupled to the ring signal detector and to the control unit, the microprocessor unit receiving a detection signal from the ring signal detector and activating the control unit.

9. The telephone interface circuit of claim 1, wherein the control unit includes a current mirroring unit to supply power to the first, second, and third control lines.

10. The telephone interface circuit of claim 9, wherein the control unit further includes a transistor, coupled to the mirroring unit, to activate the current mirroring unit, the transistor being activated during an interval in which CLID transmission occurs.

11. The telephone interface circuit of claim 9, wherein the current mirroring unit includes first, second, and third P-type transistors, each of the first, second, and third P-type transistors having an output that is connected to a respective one of the first, second, and third control lines.

12. The telephone interface circuit of claim 1, wherein the control unit includes:
an activation circuit to receive an activation signal during call pauses;
a current source coupled to the activation circuit to produce a first current; and
a current mirror coupled to the current source, the current mirror having a plurality of current outputs, the current mirror generating second currents that are proportional to the first current in each of a first, second, and third current outputs, the first, second, and third current outputs being coupled to the first, second, and third control lines, respectively.

13. In a telephone interface circuit having a first terminal and a second terminal, a method of terminating a telephone line during call pauses, the method comprising the steps of:
detecting a ring signal on the telephone line; and
grounding the first and second terminals, in response to detection of the ring signal, the step of grounding including generating an activation signal based upon detection of the ring signal and closing at least one switch to ground the first and second terminals, wherein the at least one switch includes a plurality of switches, and the step of grounding further includes
activating, in response to the activation signal, a current source to produce a first current, and
mirroring second currents that are proportional to the first current on a plurality of current mirroring elements, each one of the plurality of current mirroring elements being coupled to a respective one of the plurality of switches.

14. The method of claim 13, wherein the activation signal is generated a predetermined time interval after the ring signal is detected.

15. In a telephone interface circuit having a first terminal and a second terminal, a method of terminating a telephone line during call pauses, the method comprising the steps of:
detecting a ring signal on the telephone line; and
grounding the first and second terminals, in response to detection of the ring signal, wherein the step of grounding includes
activating, in response to the step of detecting, a current source to produce a first current,
mirroring second currents that are proportional to the first current on a plurality of current mirroring elements, each one of the plurality of current mirroring elements being coupled to a respective one of a plurality of switches, and
actuating, in response to the step of mirroring, at least one of the plurality of switches to ground the first and second terminals.

16. A telephone interface circuit with impedance termination during call pauses comprising:
first and second terminals to connect to a telephone line;
a decoupling capacitor connected to the first terminal;
a ring signal detector coupled to the first and second terminals, to detect a ring signal;
switchable termination means, coupled between the first and second terminals, for grounding the first and second terminals in a predetermined impedance upon detection of the ring signal; and
control means, coupled to the switchable termination means, for controlling the switchable termination means in response to the ring signal;
wherein the switchable termination means includes an intersection node, first and second resistors, the first resistor being coupled between the decoupling capacitor and the intersection node, and the second resistor being coupled between the second terminal and the intersection node, first and second switches, the first switch being connected in series with the first resistor between the decoupling capacitor and the intersection node, and having a control lead that is connected to the control means, and the second switch being connected in series with the second resistor between the second terminal and the intersection node, and having a control lead that is connected to the control means, and a third switch connected between the intersection node and ground, the third switch having a control lead that is connected to the control means.

17. The telephone interface circuit of claim 16, wherein the control means includes means for closing the first, second, and third switches during a time interval between a first ring signal and a second ring signal.

18. The telephone interface circuit of claim 17, further comprising processing means, coupled to the ring signal detector and the control means, for determining a call pause between the first ring signal and the second ring signal and for activating the control means during the call pause.

19. The telephone interface circuit of claim 18, wherein the means for closing includes:

a current source;

activation means, connected to the current source and the processing means, for activating the current source during the call pause; and current mirroring means, connected to the current source and the control leads of the first, second, and third switches, for mirroring a current produced by the current source and producing currents that close the first, second, and third switches.

20. A telephone interface circuit with impedance termination during call pauses, comprising:

first and second terminals to connect to a telephone line;

a decoupling capacitor connected to the first terminal;

a ring signal detector coupled to the first and second terminals, to detect a ring signal;

switchable termination means, coupled between the first and second terminals, for grounding the first and second terminals in a predetermined impedance upon detection of the ring signal; and control means, coupled to the switchable termination means, for controlling the switchable termination means in response to the ring signal;

wherein the control means includes a current source, activation means, connected to the current source and responsive to the ring signal detector, for activating the current source, and current mirroring means, connected to the current source and the switchable termination means, for mirroring a current produced by the current source and grounding the first and second terminals.

* * * * *